G. P. VAN WYE.
VACUUM INSULATED BOTTLE.
APPLICATION FILED AUG. 17, 1908.
922,363.
Patented May 18, 1909.
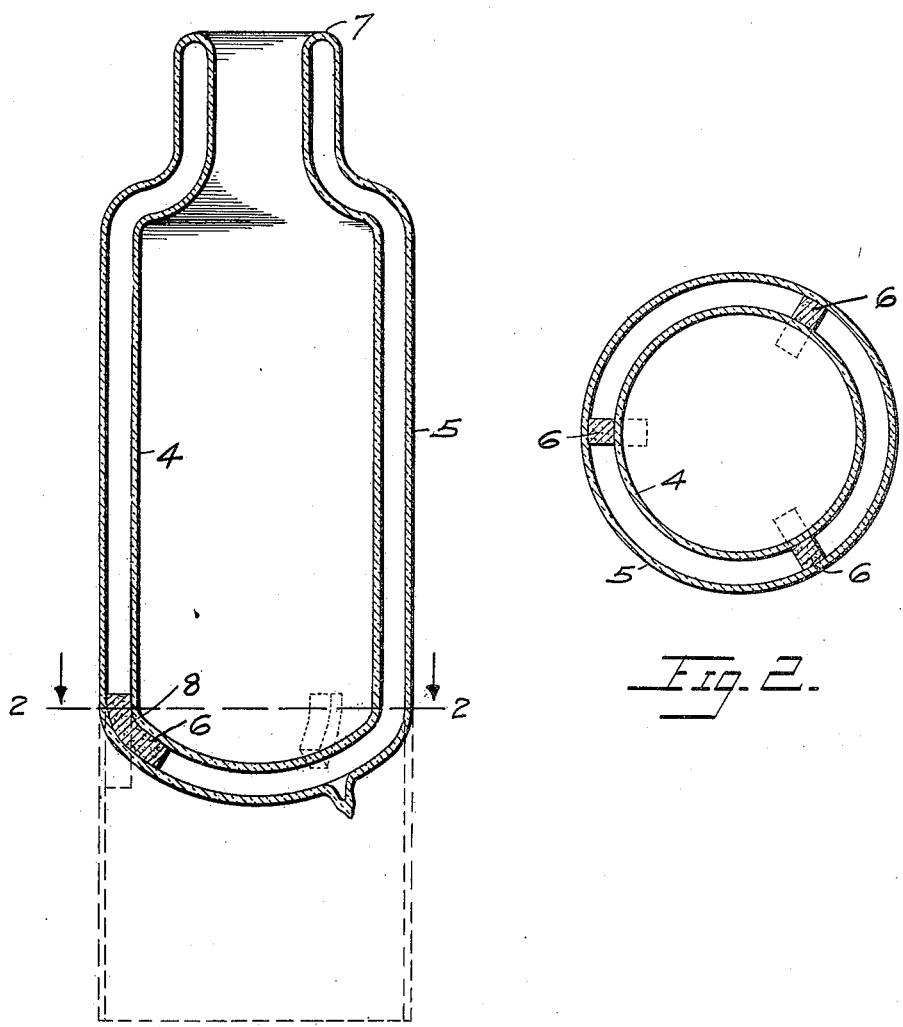

UNITED STATES PATENT OFFICE.

GARRY P. VAN WYE, OF NEW YORK, N. Y., ASSIGNOR TO WILLIAM BOYCE MORRISON, OF NEW YORK, N. Y.

VACUUM-INSULATED BOTTLE.

No. 922,363.  Specification of Letters Patent.  Patented May 18, 1909.

Application filed August 17, 1908. Serial No. 448,951.

*To all whom it may concern:*

Be it known that I, GARRY P. VAN WYE, a citizen of the United States, residing at New York, in the county and State of New York, have invented a new and useful Vacuum-Insulated Bottle, of which the following is a specification.

This invention relates to vacuum insulated, or double walled vessels with a vacuum between them; and has for its object to provide a vessel of this kind in which the asbestos supports between the walls shall be so located as to both brace and support the inner wall; a further object being to so locate, and form these supports that they will be forced into the bracing and supporting position during the formation of the bottle.

The invention is illustrated in the accompanying drawing in which,

Figure 1, is a central vertical section of a double walled vessel constructed according to my invention; Fig. 2, is a sectional view thereof on the line 2—2 of Fig. 1.

In the drawing 4, indicates the inner wall of my improved bottle, and 5, the outer wall. The supports between the walls preferably three in number, are indicated by 6. In Fig. 1 I have indicated the method of placing these supports in position.

In the manufacture of these bottles, the outer wall, or envelop, and the inner wall, or receptacle, are formed in molds, the outer part being much longer than the receptacle. After annealing, the bottom of the outer part is cut off so that the receptacle can be placed inside after which the two parts are fused together at the lip 7. The supports 6, are then placed in position, as indicated in dotted lines in Fig. 1, the supports being of sufficient length to allow the lower end to project beyond the base of the inner wall. Heat is then applied to the lower part of the outer wall, the position of which is indicated in dotted lines, and this part is melted in beneath the inner wall, as shown in full lines, during which operation the lower ends of the supports are forced into very close contact with the rounded corner 8, of the inner wall, and the contraction of the outer wall when cooling will serve to draw the base of this part a trifle nearer the base of the inner wall thereby compressing the asbestos supports between the walls.

By having a portion of the supports between the side walls, and a portion between the base walls, the inner wall is both braced against lateral vibration and supported against vertical strain, as will be readily understood; and by placing these supports in this particular position, I have the advantage of placing the supports in position when the walls are cold so far as the upper parts of the supports are concerned, and then have the advantage of shaping the lower parts to the base walls by the glass of the outer wall in a semi-melted condition, and the contraction of this heated glass upon the supports thereby insuring a very effective bracing. By this construction I can get a little firmer bracing of the parts owing to the fact that I can force the supports tightly between the side walls, and the turning in of the outer wall not only forces in the lower end of the supports but compresses the ends at the same time.

While I have described the supports as being carried in by the glass in a semi-melted condition, it is evident that the lower ends of the supports could be turned in and fastened to the base of the inner wall by cement, or in any desired manner before the outer wall is closed in; or that strips of asbestos, or other resilient material, could be cut the required shape to fit against the base of the inner wall when the ends were shoved up between the side walls. This would not alter the purpose of my invention which is to provide a plurality of strips of resilient material uniform in thickness whereby the vacuum walls will be spaced a uniform distance apart, said strips being so proportioned in size, and so mounted that one end of each strip will project above the curved portion between the bases and sides of the walls to engage the side walls positively, while the other end of each strip will project below said curved portion to engage the base walls positively, and the central portions of said strips are wedged between the said curved portions of said walls, whereby the inner wall is both supported and braced, and the breakage of the integral connection between the walls at the lip is substantially prevented.

Having thus described my invention, what I claim as new and desire to secure by Letters Patent of the United States is—

1. A vacuum insulated bottle comprising a double walled glass vessel integrally connected at the lip, and a plurality of strips of resilient material mounted between the walls, one end of each of said strips engaging the side walls, and the other ends thereof engaging the base walls, for the purpose set forth.

2. A vacuum insulated bottle comprising a double walled glass vessel with a curved portion between the base and side walls, said walls being integrally connected at the lip, and a plurality of strips of resilient material mounted between said walls, and engaging said curved portion, and the side, and base walls thereof, said strips being uniform in thickness, for the purpose set forth.

3. A vacuum insulated bottle comprising a double walled vessel composed of glass integrally connected at the lip, and a plurality of resilient and flexible supports mounted between said walls, said supports being in engagement with the sides of both walls, and being held in contact with the base of the inner wall solely by the outer wall, as and for the purpose set forth.

4. A vacuum insulated bottle comprising a double walled vessel integrally connected at the lip, and a plurality of supports mounted within the vacuum chamber, and engaging both the side walls and base walls thereof adjacent to the connecting portion between said side and base walls.

In testimony whereof I have signed my name to this specification in the presence of two subscribing witnesses.

GARRY P. VAN WYE.

Witnesses:
ADELE V. JUILLERAT,
FRANK E. LONGHRAN.